(No Model.) 2 Sheets—Sheet 2.
C. A. JACKSON.
ELECTRIC MOTOR FOR CARS.
No. 487,329. Patented Dec. 6, 1892.
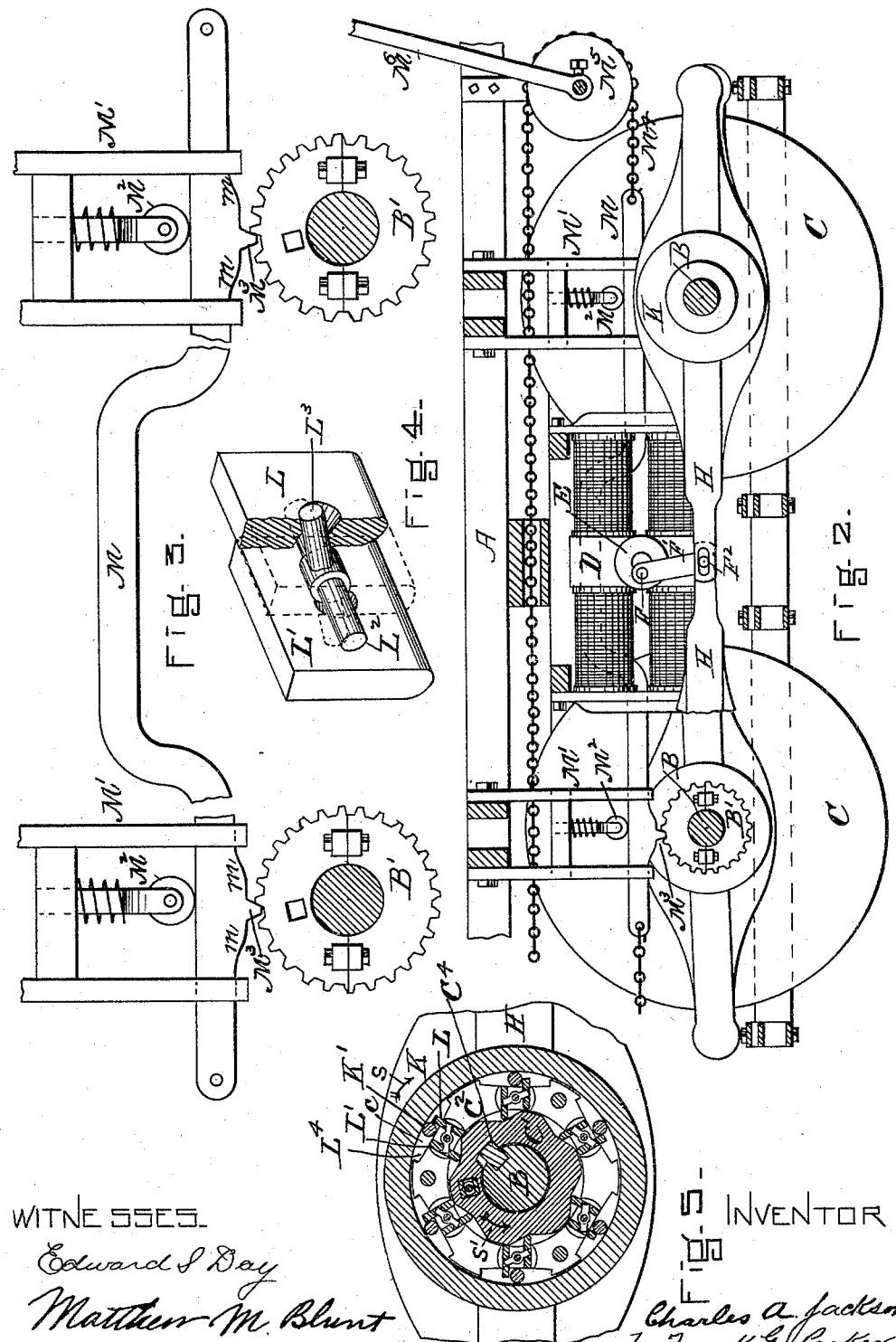
WITNESSES
Edward S. Day
Matthew M. Blunt
INVENTOR
Charles A. Jackson,
by Frank G. Parker
Atty.

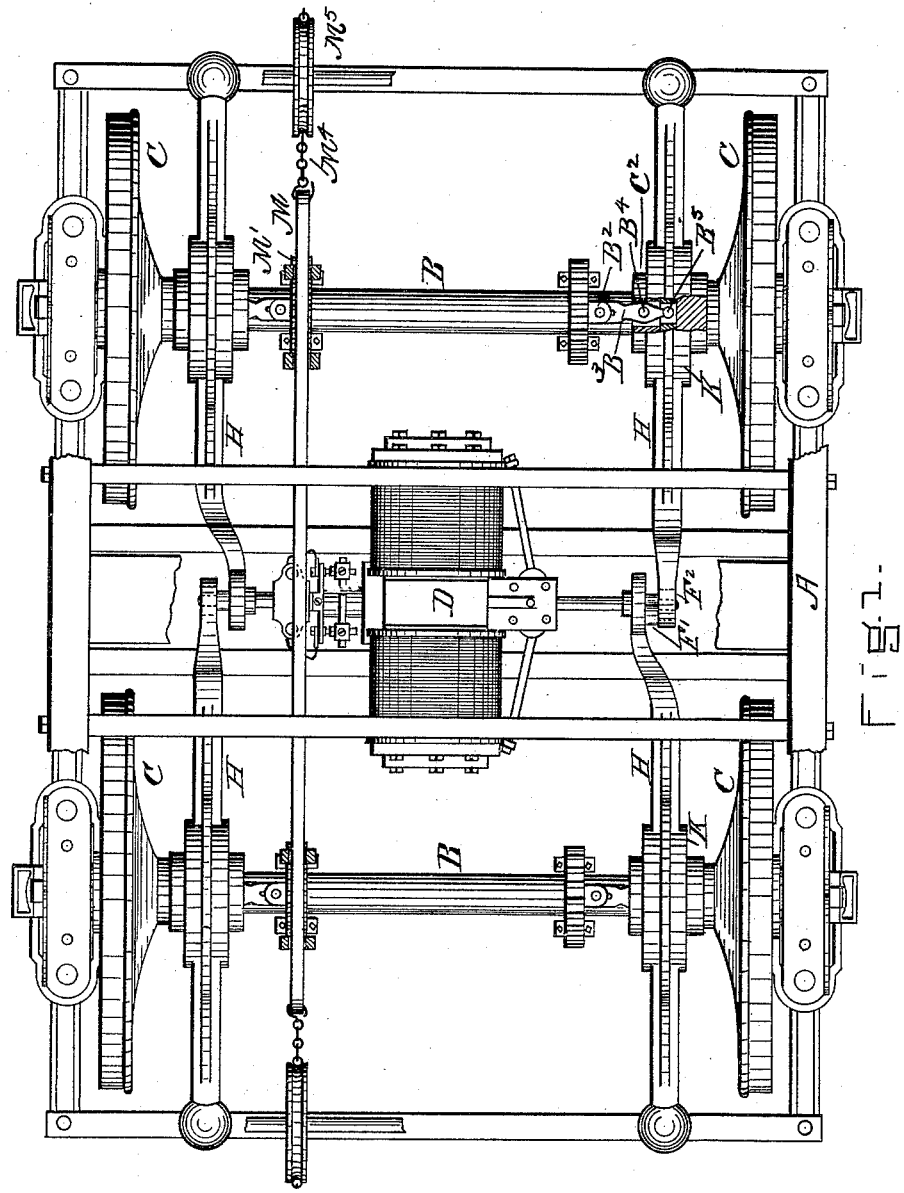

UNITED STATES PATENT OFFICE.

CHARLES ALMAN JACKSON, OF READING, MASSACHUSETTS.

ELECTRIC MOTOR FOR CARS.

SPECIFICATION forming part of Letters Patent No. 487,329, dated December 6, 1892.

Application filed August 3, 1891. Renewed September 29, 1892. Serial No. 447,340. (No model.)

*To all whom it may concern:*

Be it known that I, CHARLES ALMAN JACKSON, of Reading, in the county of Middlesex and State of Massachusetts, have invented certain new and useful Improvements in Electric Motors for Cars, of which the following, taken in connection with the accompanying drawings, is a specification.

My invention relates to that class of car-motors in which a reciprocating motion is converted to a rotary motion, the object being to add to motors of this class a device by which the direction of rotation may be readily and promptly reversed without stopping the motion. This object I attain by the mechanism shown in the accompanying drawings, in which—

Figure 1 is a plan of one truck-frame and its connected running-gear, showing my improvements attached. Fig. 2 is a side elevation of the same. Fig. 3 is a side elevation showing one of the reversing-rods and its connecting-gear adapted to operate on the friction-clutch device and cause a reversal of the direction of rotation of the wheel. Fig. 4 is a view in perspective showing details. Fig. 5 is a vertical section taken through one of the clutch devices, showing its construction and position on the axle.

In the drawings I have shown my invention as applied to a car. It is obvious that other applications of it may be made.

A represents in general the framework of the car, and B B the axles, and C the wheels. These parts, including the truck-frame, may be constructed in any of the usual methods. The only modifications required are simply to make such changes as will admit of hanging my appliances to the frame.

D, Figs. 1 and 2, represents an electric motor. To the armature E of this motor I attach a crank-pin F, which operates a link F', which in turn operates by means of a pin $F^2$ the oscillating levers H H. These oscillating levers H H swing about the center of the axles B B, and each has connected to it a friction-clutch ring K, (see Fig. 5,) this clutch-ring being concentric with the axle, and as it is connected to the lever H it must as the lever oscillates receive a back-and-forth partial rotation. Within this clutch-ring K is a second ring $C^2$. This ring is also concentric to the axle and has upon it a series of buttress-pieces L L', located as shown in Fig. 5 and constructed and arranged as shown in Fig. 4. These buttress-pieces are placed loosely in recesses formed for that purpose within the ring-piece $C^2$, as shown in Fig. 5, and are loosely connected to each other by an oscillating bar $L^3$, the said oscillating bar $L^3$ having an axis-bar $L^2$, which is journaled to the side walls of the ring $C^2$, so that as one of the buttress-bars—L, for instance—is forced upward then its companion buttress L' will be moved down. Within the ring $C^2$, and also concentric with the axle, I have a third ring C'. This third ring C' is loosely attached to the axle by means of a spline $C^4$. The spline is made fast to the axle B, but it does not fit closely in the way made for it on the interior of the ring C', so that the ring C' may have a limited motion of rotation about the axle B. The outer periphery of the ring C' is recessed, as shown in Fig. 5, the said recess being so located in relation to the buttress-ring $C^2$ that when the rings C' $C^2$ occupy the position shown in Fig. 5 in relation to each other then the buttress L' will be down and the buttress L up; but if the rings C' $C^2$ are changed in their relative position, as will be hereinafter described, then the lowest part of the recess will be under the buttress L and that buttress will be down, while its companion L' will be up. The object of thus arranging these buttresses is that the clutch device may be made to operate in either direction—that is, if the clutch-ring K is turned in the direction indicated by the arrow S then the clutch-roller K' will come in contact with the buttress L and be free to rotate on its own center, even if it should be in contact with the inside of the ring K; but if the ring K is moving in the direction opposite to the arrow S then the clutch-roller K' will roll over the top of the buttress L' and on the incline $L^4$. This will bring the clutch-roller firmly against the inside of the clutch-ring K, and then the further motion of the ring K will be imparted to the ring C and through it and the ring C' to the axle B, and so long as the buttresses are in the position represented in Fig. 5 the oscillation of the lever H will cause the wheel to move in the direction of the arrow S', and if the buttresses L L' occupy the other position—that is, with L' up and L down—then the oscillation of the lever H would cause the wheel to revolve in the direction of the arrow S.

I will now describe the means that I use for changing the position of the buttress-pieces L L'.

$M^6$ is a hand-lever connected to a chain-wheel $M^5$, said chain-wheel being adapted to operate a chain $M^4$, through which the clutch-rod M is operated—that is, moved longitudinally in either direction. This rod M slides in slots made in the housing-pieces M', and is so arranged in connection with the said slots that as it is moved longitudinally the incline m, coming in contact with the lower part of the slot, causes the said rod to move bodily upward, by which action the projection $M^3$ is lifted out of contact with the teeth on the gear-wheels B'. (See Fig. 3.)

$M^2$ $M^2$ are wheels attached to a spring-standard, as shown, and serve to keep the bar N down to its lowest position when the inclines m are not in contact with the lower part of the slots. The gear-wheel B' rotates freely on the axle B, but is connected by a boss $B^2$ and lever $B^3$ to the clutch device already described, the lever $B^3$ having a central fulcrum at $B^4$ connected to the buttress-ring $C^2$ and an end fulcrum $B^5$, connected to the recessed ring C', so that as the lever $B^3$ is swung in one direction or the other by turning the gear-wheel B' then a relative movement of the buttress-ring $C^2$ and the recessed ring C' is made and a consequent change in the relative positions of the buttress-pieces L L' is effected.

I claim—

1. In an electric propelling device, the combination of an electric-motor-driven crank-pin F, link F', adapted to oscillate the levers H H, and the oscillating levers H H, having attached to each a friction-clutch ring K, with the rings $C^2$, buttress-pieces L L', and the recessed ring-pieces C', attached to the car-axles B, all operating together, substantially as and for the purpose set forth.

2. In an electric propelling device, the combination of a sliding rod M, having projections $M^3$, gear-wheel B', and lever $B^3$, adapted to operate the clutch-ring C and recessed rings C', with said buttress-ring $C^2$ and recessed ring C', and buttresses L L', clutch-roller K', and oscillating clutch-ring K, substantially as and for the purpose set forth.

In testimony whereof I have signed my name to this specification, in the presence of two subscribing witnesses, on this 3d day of July, A. D. 1891.

CHARLES ALMAN JACKSON.

Witnesses:
 URIAH COPP, Jr.,
 JOHN B. GOULD.